United States Patent [19]

Moses

[11] 3,771,130

[45] Nov. 6, 1973

[54] MODE SELECTION NETWORK

[75] Inventor: Adrian J. Moses, Newhall, Calif.

[73] Assignee: Lear Siegler, Inc., Santa Monica, Calif.

[22] Filed: Oct. 10, 1972

[21] Appl. No.: 296,093

[52] U.S. Cl. .............. 340/147 LP, 307/242, 328/97, 328/152, 340/147 C, 340/365 E

[51] Int. Cl. .............. G06f 3/02

[58] Field of Search .............. 340/147 C, 147 LP, 340/365 E; 328/152, 97; 307/242; 200/5 B

[56] References Cited

UNITED STATES PATENTS 3,581,108 5/1971 Eisenmenger .............. 328/97

OTHER PUBLICATIONS

"Static Switches," Giacomelli et al., Control Engineering, May 1960, pp. 118 to 122.

*Primary Examiner*—Thomas B. Habecker
*Assistant Examiner*—Robert J. Mooney
*Attorney*—Harold L. Jackson et al.

[57] ABSTRACT

A mode selection network for permitting one of several different operating modes to be selected is disclosed. The network is designed to accommodate push on/push off button operation and to protect against false operation due to stuck switches, mechanical bouncing of switch contacts, and momentary loss of power. A plurality of identical mode selector circuits are provided for the multiple push bottom switches, one for each of the modes that can be selected, and serve to provide a mode signal to a binary encoder circuit via a push-to-reset gate in response to operation of a switch connected thereto. Binary encoded mode signals are provided to a bank of storage capacitors through a transient gate which is momentarily enabled after a selected time delay following switch initiation. The time delay effectively requires that a mode selector switch be operated for a selected time duration and thereby prevents contact bounce from causing a false mode selection. The signals stored by the capacitors are applied through a buffer gate to a decoder. Decoded mode signals are provided at a single output terminal for the selected mode. An array of inhibit gates are connected to receive output signals from the decoder to require switch operation for mode deactivation.

16 Claims, 5 Drawing Figures

PATENTED NOV 6 1973

3,771,130

SHEET 2 OF 3

MODE SELECTION NETWORK

BACKGROUND OF THE INVENTION

1. Field of the Invention

This invention generally relates to circuits for permitting one of several different operating modes of a system to be selected for operation.

2. Description of the Prior Art

Systems having multiple operating modes are well known and may appear in any number of different forms for the purpose of performing several different operations as selected. Each of these systems may require a mode selection network or circuit for control of the system and to permit selection of a desired one of the several different operating modes.

The necessary and desired accuracy and reliability of a selection circuit largely depends on the application of the system being controlled. For example, the mode selection network for a portable mini-computer is desirably accurate and reliable; but its failure and/or proneness to error is by no means a matter of life or death. By comparison, the reliability and accuracy of a mode selection network that is employed for controlling the operation of a flight computer of an aircraft may well indeed involve the safety of passengers. The mere failure or malfunction of a simple mechanical switch and/or the electronic circuitry associated therewith may result in the aircraft becoming irretrievably out of control.

Simple mechanical malfunctions become an increasingly important consideration as a device ages and is continually used. For example, a push button switch may become stuck or its contacts may be jolted to erroneously cause switching. Further, a two position mechanical switch is capable of being vibrated or otherwise mistakenly repositioned either by a wearing out of parts or by accident.

It is accordingly the intention of the present invention to provide a mode selection circuit that overcomes each of the foregoing propensities of mechanical switching devices to malfunction.

SUMMARY OF THE INVENTION

Briefly described, the present invention involves a mode selection network which accommodates push on/push off switch operation, isolates switches to preclude malfunctions that may result from a stuck switch, prevents false operation or mode selection due to switch contact bounce, protects against malfunction due to momentary power failures, and provides mutually exclusive operation of the multiple switches included in an array.

More particularly, the subject mode selection network includes an array of mode selector circuits each of which is adapted to provide mode signals in response to operation of a corresponding mechanical push button switch connected thereto. Each mode selector circuit includes a latching circuit that is connected to be automatically reset after a predetermined time to remove any mode signal that is unintentionally being produced by a stuck switch. An encoder circuit provides binary signals in response to the mode signals. The binary signals serve to charge selected ones of a bank of storage capacitors via a transient gate which is momentarily enabled after a preselected time delay following operation of the push button switch to provide protection against false operation due to contact bounce. A buffer gate is subsequently enabled to permit the binary signals stored by the storage capacitors to be applied to a decoder and to utilization devices. An inhibit gate is connected to receive the output of the decoder to inhibit application of mode signals to the encoder from the selector circuit corresponding to an already selected mode in operation.

The objects and many attendant advantages of the invention will be more readily appreciated as the same becomes better understood by reference to the following detailed description which is to be considered in connection with the accompanying drawings wherein like reference symbols designate like parts throughout the figures thereof.

DESCRIPTION OF THE PREFERRED EMBODIMENT

Figure 1:
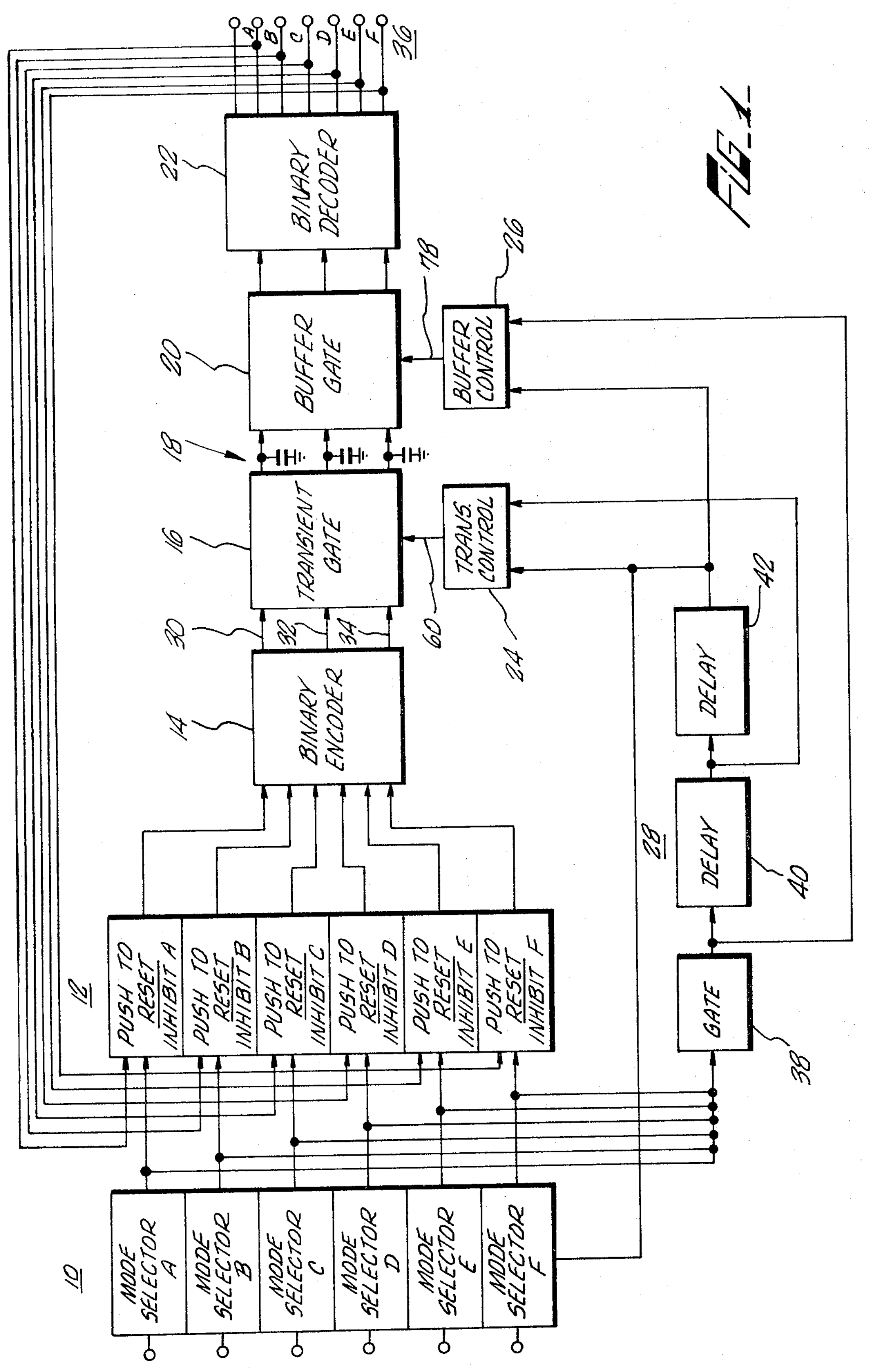
FIG. 1 is a schematic block diagram illustrating a mode selection network in accordance with the present invention.

Referring to FIG. 1, a mode selection network in accordance with the present invention generally includes an array of mode selector circuits 10, a corresponding array of inhibit circuits 12, a binary encoder circuit 14, a transient gate 16, a bank of storage capacitors 18, a buffer gate 20 and a binary decoder circuit 22. The transient gate 16 and the buffer gate 20 are connected to be respectively operated in response to control circuits 24 and 26 which are both under the control of a delay circuit 28.

The mode selector circuits 10 are each adapted to respond to a digital-type signal provided by the operation of a push button switch or the like (not illustrated) connected to input terminals. For example, a "high" voltage signal may be provided when the push button switch is depressed while a "low" voltage signal is provided when the switch is not depressed. Assuming that the selector circuits 10 will respond to high signals, depression of a switch results in a mode signal being provided by the mode selector circuit to which the switch is connected.

The mode signals are applied to the binary encoder 14 through an associated one of the inhibit circuits 12 unless the mode corresponding to the operated switch selector circuit 10, and inhibit circuit 12, has already been selected and is in operation. In such an event, the inhibit circuit 12 receives a feedback signal from the decoder 22 and thereby is caused to effectively block transmission of the mode signal to the encoder 14.

Binary encoded signals developed by the encoder circuit 14 are provided over a suitable number of output leads. In the illustrated example, three output leads 30, 32 and 34 are shown and correspond to the three binary bits which would be required to accommodate the illustrated six different mode selector circuits 10. Table I hereinbelow provides exemplary binary words that may be used for each of six different modes A through F. The leads 30 and 34 have been arbitrarily assigned as the least significant bit and the most significant bit, respectively.

TABLE I

Output levels at leads 30, 32, 34 for three bit binary words

| MODE | Outputs 34 | 32 | 30 |
|---|---|---|---|
| A | L | L | H |
| B | L | H | L |
| C | L | H | H |
| D | H | L | L |
| E | H | L | H |
| F | H | H | L |

The binary signals provided by the encoder 14 are applied to charge the respective storage capacitors 18 via the transient gate 16 when it is momentarily enabled as hereinafter discussed in greater detail.

The charges stored by the capacitors 18 are collectively applied as input signals to the binary decoder circuit 22 via the buffer gate 20 which is normally enabled. The binary decoder circuit 22 provides an output signal on the one output terminal 36 that corresponds to the mode for which a push button switch was operated.

The delay circuit 28 serves to momentarily enable the transient gate 16 and disable the buffer gate 20 to permit charging of the storage capacitors 18 by the binary encoded mode signals. As shown, the delay circuit 28 includes an input gate 38 and a pair of delay circuits 40 and 42 connected in series. The input gate 38 is connected to receive the mode signal provided by the one mode selector circuit 10 corresponding to an operated push button switch. The mode signal received by the gate 38 operates to trigger the delay circuit 40 and also operates to disable the buffer control circuit 26 to disable the buffer gate 20 (See waveform 3E, FIG. 3). An output is provided by the gate 38 only as long as a mode signal is present. Accordingly, should a button or other switch be operated for less than the predetermined length of time, i.e., 20 milliseconds, set by the delay circuits 40 and 42, the buffer control circuit 26 and the buffer gate 20 are permitted to return to the respective ambient conditions thereof. In such a case the delay circuit 40 fails to provide an output signal to the second delay circuit 42 and to the transient control 24. On the other hand, assuming that the mechanical switch is operated for the preselected length of time set by the combined time delays of the delay circuits 40 and 42, (See waveform 3A, FIG. 3), the output of the delay circuit 40 enables the transient control circuit 24 (See waveform 3D, FIG. 3) which in turn enables the transient gate 16. The delay circuit 42 is simultaneously triggered and operates to provide an output signal after a short time delay, i.e., 1 millisecond, to re-enable the buffer control circuit 26 and disable the transient control circuit 24 (See waveforms 3D and 3E, FIG. 3). The short time delay provided by the delay circuit 42 is selected to allow the storage capacitors 18 to be charged by the binary encoded mode signals.

Figure 3:
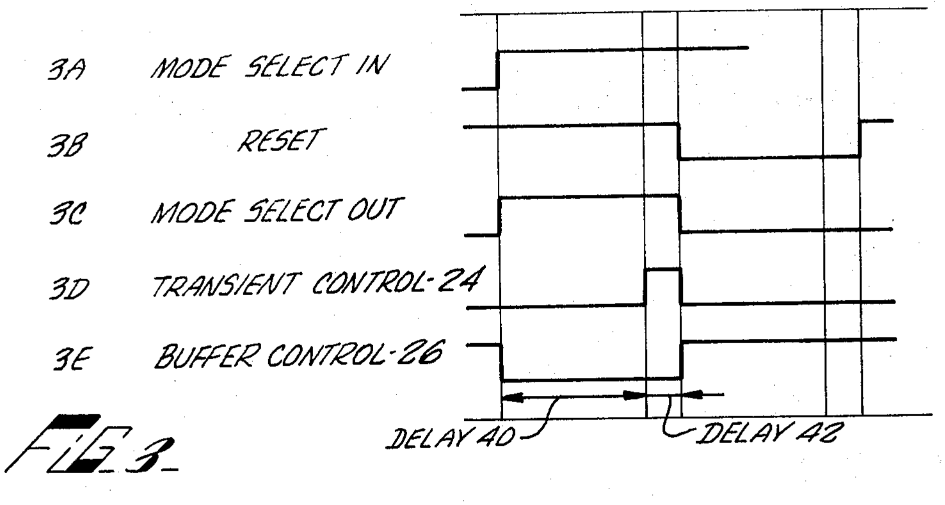
FIG. 3 is a graphic diagram illustrating a series of waveforms that are useful for understanding the operation of the subject invention.

The result, as shown by waveforms of FIG. 3, is that the transient gate 16 is momentarily enabled for a length of time corresponding to the delay provided by the delay circuit 42 (See waveform 3D, FIG. 3) while the buffer gate 20 is disabled for the combined delay provided by the delay circuits 40 and 42 (See waveform 3E, FIG. 3). Accordingly, the capacitors 18 are permitted to be charged only in response to the intentional operation of the switches, the combined delay provided by the delay circuits 40 and 42 eliminating the possibility that mode signals due to transients will be received by the storage capacitors 18 and the relatively short delay of the delay circuit 42 permitting the capacitors 18 to be charged.

As may be observed from the waveforms 3D and 3E, the buffer gate 20 is returned to its normally enabled condition concurrently with the transient gate 16 being returned to a disabled condition. The charge on the capacitors 18 is accordingly then continually applied to the binary decoder 22, which responds by providing an output on the one output terminal corresponding to the selected mode.

The storage capacitors 18 and buffer gate 20 primarily serve to isolate the inhibit circuits 12 from the binary decoder 22 to prevent oscillation within the network itself as will become more readily evident from the following detailed description. The capacitors 18 also serve as a memory that retains the identity of the selected mode in operation should a momentary power failure occur. The time duration accommodated by the storage capacitors 18 may be set as desired. For example, a 30 millisecond power failure may be readily accommodated by the capacitors 18 and would be generally satisfactory with respect to an aircraft flight computer.

Figure 2:
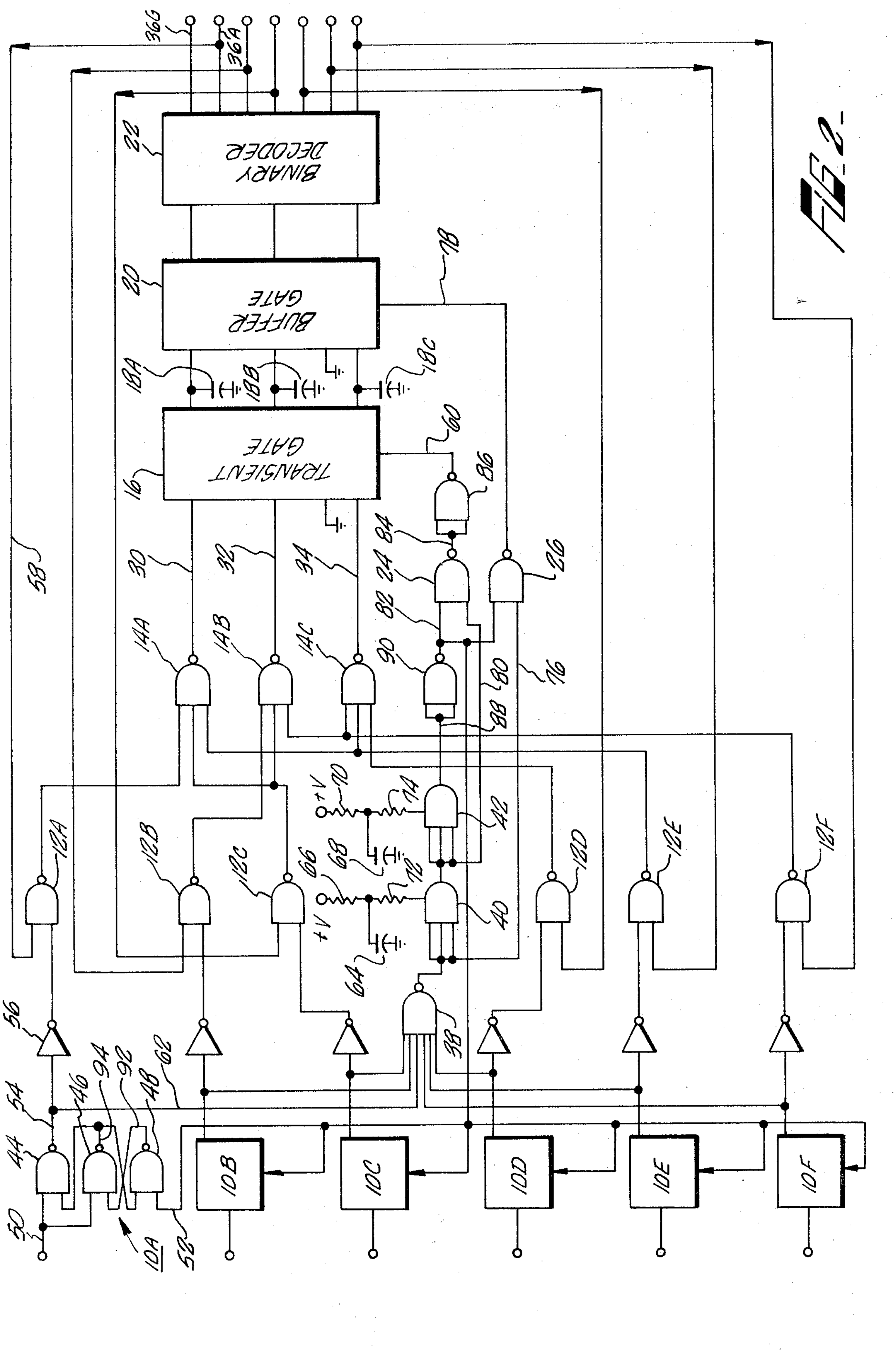
FIG. 2 is a detailed schematic diagram illustrating logic circuitry that is useable with the present invention.

Referring now to FIG. 2, each of the mode selector circuits 18 includes three NAND gates 44, 46 and 48. The ambient output of the NAND gate 44 is high and the ambient input at the terminal 50 is low. The ambient reset signal applied to the NAND gate 48 via the lead 52 is high and is momentarily low as shown by waveform B of FIG. 3, to reset the latch formed by the NAND gates 46 and 48. Referring to the mode selector circuit 10A as exemplary of all such circuits, the application of a high input signal to the gate 44 via the terminal 50 in response to operation of a push button switch or the like causes a mode signal having a low level to be provided at the lead 54. The low mode signal is inverted to be a high signal by an inverter circuit 56 and applied as one input to an inhibit NAND gate 12A. The NAND gates 12B, 12C, 12D, 12E and 12F serve as the inhibit circuits for the mode selector circuits 10B through 10F.

The feedback signal provided over the lead 58 from the output terminal 36A to the inhibit gate 12A is normally high and becomes low only when the mode "A" has been selected as indicated by a low output signal provided at the output terminal 36A. The concurrent application of high input signals to both inputs of the inhibit gate 12A results in a low signal being applied to the encoder NAND gate 14A. As a result a high signal is provided at the encoder output terminal 30 while low output signals appear on the encoder output terminals 32 and 36 as indicated by Table I hereinabove. These encoder output signals will be present when the mode selector circuit is receiving an input signal from the switch connected to the input terminal 50 and will continue until the switch is no longer operated or until a reset signal is applied to the NAND gate 48 via the lead 52, whichever occurs first. As earlier explained, the signals provided from the encoder gates 14A, 14B and 14C will be applied to the storage capacitors 18A, 18B and 18C, respectively, when the transient gate 16 is enabled by a high level signal appearing at the lead 60 from the transient control circuit 24.

Mode signals provided from the NAND gate 44 at the terminal 54 are also applied to the input NAND gate 38 of the delay circuit 28 via a lead 62 to operate the delay circuit 40 and subsequently, the delay circuit 42. The delay provided by each of the circuits 40 and 42 is determined by appropriately sizing a timing capacitor 64 and resistor 66 for the delay 40 and a capacitor 68 and resistor 70 for the delay 42. Resistors 72 and 74 serve as current limiting resistors. As shown, the output of the input NAND gate 38 is also applied to the buffer control NAND gate 26. Since the output of the NAND gate 38 is normally a low signal, the buffer control gate 26 normally provides a high signal to the buffer gate 20 via the lead 78 to keep the buffer gate 20 normally enabled as shown by waveform E of FIG. 3. The low mode signal provided from the selector NAND gate 44, or any other selector circuit, results in high signals being concurrently applied to both of the inputs of the buffer control NAND gate 26. As a result, a low signal is provided by the NAND gate 26 to temporarily disable the buffer gate 20.

Following the predetermined time delay set by the delay circuit 40, a high signal is provided as an input to the transient control NAND gate 24 via the lead 80. In that the other of the two input signals applied to the NAND gate 24 is normally a high signal, the NAND gate 24 then provides a low signal as an output at the terminal 84. This low signal is inverted by the NAND gate 86 connected as an inverter and provided as a high signal at the lead 60 to enable the transient gate 16.

Following the delay provided by the delay circuit 42, a high signal is provided at the output lead 88 thereof. This high signal is converted to a low signal by a NAND gate 90 connected as an inverter and concurrently applied to the transient control NAND gate 24, the buffer control NAND gate 26 and to the NAND gate 48 of the mode selector circuits 10.

The low signal applied to the transient gate 24 causes a high output signal to be provided at the lead 84 to be inverted to a low signal by the inverter gate 86 and applied to disable the transient gate 16 via the control lead 60. The time during which the transient gate 16 remains enabled is set by the delay circuit 42 and permits the capacitors 18A, 18B and 18C to be charged by any signals appearing at the leads 30, 32 and 34 from the encoder gates 14A, 14B and 14C.

The low signal applied to the buffer control NAND gate 26 results in a high signal being provided via the lead 78 to enable the buffer gate 20. The charge on the storage capacitors 18A, 18B and 18C is thereby applied to the decoder circuit 22. The selected mode is operated by the resulting low signal provided at the output terminal 36A.

Finally, the low signal provided by the inverter 90, when applied to the NAND gate 48 via the lead 52, resets the latch of the selector circuit 10A. A high signal is provided at the output lead 92 of the NAND gate 48 in response to the low input signal. Such high output signal is applied as one of the two inputs of the NAND gate 46. Thus, if a high signal is simultaneously being provided at the input terminal 50, the NAND gate 46 will provide a low output signal at the lead 94 and which is in turn applied as an input to the NAND gate 44 to effectively return the signal at the leads 54 to its ambient high level. The result is that the output of the mode selector circuit 10A is returned to its ambient signal level irrespective of the input signal appearing at the input terminal 50 following a time period equal to the combined delay provided by the delay circuits 40 and 42. A mechanical sticking or similar failure of a push button switch connected to the input terminal 50 will accordingly have no effect on the continued operation of the mode selector circuit 10A once the mode has been selected.

A normally operating switch connected to the input terminal 50, however, will provide a low signal to the input of the NAND gates 44 and 46 and will thereby cause the desired ambient high output signal to be provided at the lead 54. If such a low signal should occur prior to the end of the combined delay provided by the delay circuits 40 and 42, no mode would be selected for failure of the mechanical switch to be operated for a sufficient length of time. On the other hand, if a low signal is provided by the switch after the combined delay of the delay circuits 40 and 42, the resetting operation previously described would have already returned the output signal at the lead 54 to an ambient high signal.

The low feedback signal provided over the lead 58 from the output terminal 36A to the inhibit NAND gate 12A fixes the output of the NAND gate 12A at a high signal level regardless of the signal from the selector circuit 10A. As may be recalled, the mode signal applied to the encoder 14 is a low level signal. Accordingly, reoperation of the selector switch connected to the selector circuit 10A will result in a high level signal being provided to the NAND gate 14A. Hence, a low signal will be provided at all of the output leads 30, 32 and 34 since all of the inputs to the gates 14A, 14B and 14C are at the ambient high level. When the transient gate 16 is enabled, as earlier discussed, the storage capacitors 18A, 18B, and 18C will receive low signals to be stored. Such low signals, when applied through the buffer gate 20 to the decoder 22, will be decoded as a no-mode condition which may be indicated by having a low signal provided at the output terminal 36G to which an appropriate indication device may be connected if desired.

It is to be noted that if a different mode selector circuit such as circuit 10C were to be operated, the inhibit circuit 12A would be freed when the output signal at the output terminal 36A is returned to its ambient high level.

Hence, it may be generally observed that the deactivation of a mode may be accomplished by operation of the switch corresponding to the mode to be deactivated and that such switch operation initiates identical operation of the subject invention with the exception that the one inhibit gate corresponding to the mode presently in operation is locked to provide an ambient high signal to effectively have a low no-mode binary word provided from the encoder 14 to the storage capacitors 18 and subsequently to the binary decoder 22.

The mode selector circuits 10B through 10F are each connected to operate in identical fashion to the mode selector circuit 10A except that the output of the associated inhibit gate is connected to appropriate ones of the three encoder NAND gates 14A, 14B and 14C as defined by Table I to provide the desired output signal level at the output leads 30, 32 and 34 in response to operation of a selector switch.

Figure 4:
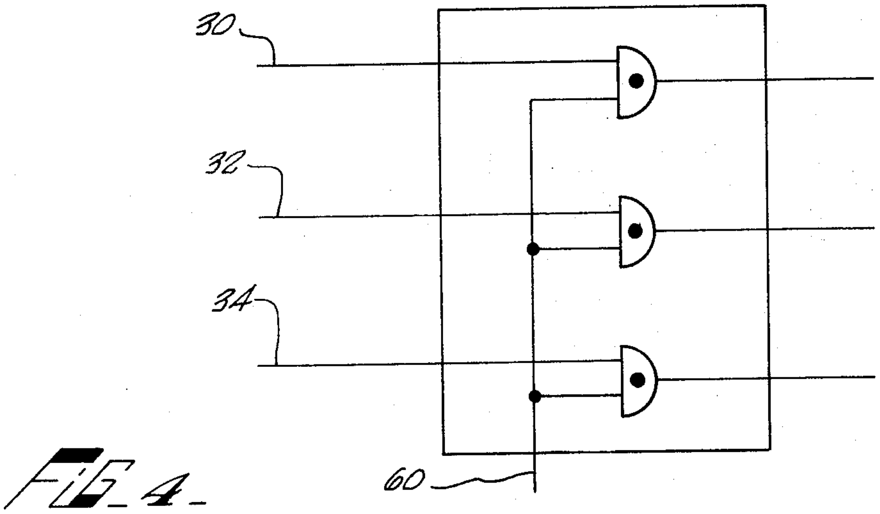
FIG. 4 is a schematic diagram illustrating exemplary logic circuitry and may be used to provide a transient gate and/or buffer gate that are useable with the present invention.

Both the transient gate 16 and the buffer gate 20 may simply include a series of conventional gating devices which are respectively enabled by application of an appropriate control signal at the respective leads 60 and 78. Referring to FIG. 4, simple control logic would include a trio of AND gates which may be connected to have one of the two input terminals connected to receive the control signals provided at the lead 60 or the lead 78. For example, the second input of each of the gates would be connected to receive one of the output leads 30, 32 or 34 of the encoder circuit 14 in the case of the transient gate 16. Any high level signal provided over these three input leads would then result in a high level output signal from the corresponding AND gates when an enabling high level signal is simultaneously provided over the lead 60. As a practical alternative, the three gates illustrated in FIG. 4 may be replaced by conventional D-type flip-flop circuits which operate to provide as an output whatever signal is applied to its input terminal when the flip-flop is enabled.

Figure 5:
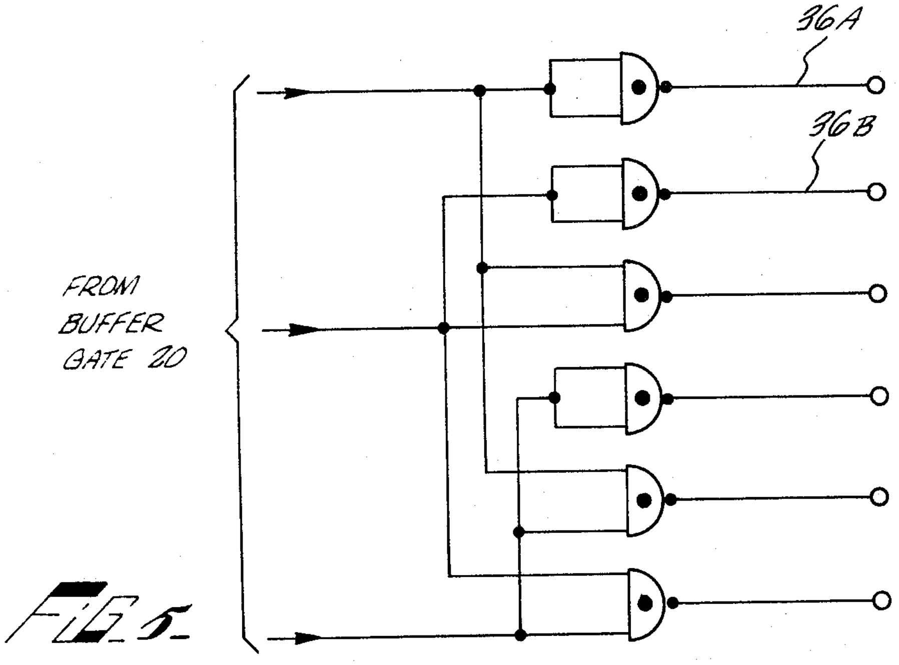
FIG. 5 is a schematic diagram illustrating exemplary logic circuitry that may be used to provide a decoder that is useable with the present invention.

An exemplary binary decoder 22 is illustrated by FIG. 5. As shown, an array of NAND gates is connected to receive as an input thereto selected ones of the three output signals provided by the buffer gate 20. The connections would be dictated by the specific code used. In the specific example, the several gates are connected in conventional fashion as defined by the binary words of Table I. Although the output lead 36G is not illustrated in FIG. 5, it may be readily understood by anyone skilled in the art that a seventh NAND gate may be provided to which all three of the input leads from the buffer gate 20 are connected as inputs through inverters such that when a low signal appears on all three leads simultaneously, such seventh NAND gate would provide a low output signal.

From the foregoing discussion, it is now clear that the subject invention provides a selection network which features protection against malfunctions due to a stuck mechanical switch, requires that a mechanical switch be positively operated to both select a mode as well as to deactivate a mode, and which includes a memory feature that protects against momentary loss of power.

While a preferred embodiment of the present invention has been described hereinabove, it is intended that all matter contained in the above description and in the accompanying drawings be interpreted as illustrative and not in a limiting sense and that all modifications which fall within the scope and spirit of the present invention may be made.

What is claimed is:

1. A circuit for controlling the presence of a mode selecting output signal at one of several output terminals respectively corresponding to several different modes to have a mode activated or deactivated in response to operation of a switching device, the network including:

an array of switching circuits connected to said switching devices, each switching circuit providing a mode signal in response to the operation of a switching device connected thereto;

encoder means for encoding mode signals applied thereto from any of said switching circuits, encoded mode signals being provided by said encoder means;

storage means for storing encoded mode signals applied thereto;

gating means for selectively permitting encoded mode signals to be applied for storage to said storage means;

control means for controlling said gating means in response to a switching device being operated for a preselected length of time; and output means for providing mode selecting output signals at said several output terminals in accordance with encoded mode signals stored by said storage means.

2. The circuit defined by claim 1 further including:

inhibit means for preventing a mode signal from being provided to said encoder means from a switching circuit connected thereto whenever the mode selecting output signal provided at one of said several output terminals is applied to said inhibit means.

3. The circuit defined by claim 2, said inhibit means including an array of inhibit circuits corresponding to said array of switching circuits, the mode signals from individual switching circuits being applied to said encoder means through a different one of said inhibit circuits which is connected to the individual switching circuits, the mode selecting output signal for each different mode being applied to the one inhibit circuit corresponding to the selected mode.

4. The circuit defined by claim 1, wherein said encoder means is a binary encoder circuit having a number of encoder output terminals sufficient to accommodate the number of binary bits forming binary words used to identify the different modes.

5. The circuit defined by claim 4, wherein said storage means is a plurality of capacitors, one capacitor being provided for each of said encoder output terminals, said capacitors being selectively charged by encoded mode signals provided from said encoder output terminals through said gating means.

6. The circuit defined by claim 1, said gating means including:

a first gate circuit connected between said encoder means and said storage means to permit encoded mode signals to be applied to said storage means when said first gate is enabled; and a second gate circuit connected between said storage means and said output means for permitting encoded mode signals stored by said storage means to be applied to said output means when said second gate circuit is enabled, said second gate circuit blocking the application of signals from said storage means to said output means by being disabled when encoded mode signals are being applied through said first gate circuit for storage by said storage means.

7. The circuit defined by claim 6, said control means including:

first control means for enabling said first gate circuit to permit encoded mode signals to be applied to said storage means for storage; and second control means for disabling said second gate circuit to permit encoded mode signals applied to said storage means to be stored.

8. The circuit defined by claim 7, said control means further including delay means connected between said array of switching circuits, and said first and second control circuits for having mode signals operate said first and second control circuits after a predetermined period of time following initiation of a switching device that is operated for a predetermined time period set by said delay means.

9. The circuit defined by claim 1, said output means including a binary decoder circuit connected to said storage means for providing mode selecting output signals at said output terminals as determined by the signals stored by said storage means, wherein whenever no encoded mode signals are stored by said storage means no mode selecting output signal is provided.

10. The circuit defined by claim 1, wherein said switching circuits each include latch means for terminating any mode signal provided thereby after a predetermined length of time in response to a reset signal provided from said control means.

11. The circuit defined by claim 10 further including:

inhibit means for preventing a mode signal from being provided to said encoder means from a switching circuit connected thereto whenever the mode selecting output signal provided at one of said several output terminals is applied to said inhibit means.

12. The circuit defined by claim 11, wherein said storage means is a plurality of capacitors, which are selectively charged by encoded mode signals provided from said encoder means through said first gate circuit.

13. The circuit defined by claim 12, said output means including a binary decoder circuit connected to said capacitors for providing a mode selecting output signal at one of said output terminals in accordance with the encoded mode signals stored by said capacitors, wherein whenever no encoded mode signals are stored by said capacitors no mode selecting output signal is provided.

14. The circuit defined by claim 13, wherein said switching circuits include latch means for terminating any mode signal provided thereby following a predetermined time period and in response to a reset signal provided from said delay means.

15. The circuit defined by claim 14, said inhibit means including an array of inhibit circuits corresponding to said array of switching circuits, the mode signals from individual switching circuits being applied to said encoder means through a different one of said inhibit circuits which are respectively connected to individual corresponding switching circuits, the mode selecting output signal provided for each different mode by said decoder circuit being applied to the one inhibit circuit corresponding to the selected mode.

16. The circuit defined by claim 15, wherein said encoder means is a binary encoder circuit having a number of encoder output terminals sufficient to accommodate the number of binary bits forming binary words used to identify the different modes.

* * * * *